US009277262B2

(12) United States Patent
Elm et al.

(10) Patent No.: US 9,277,262 B2
(45) Date of Patent: Mar. 1, 2016

(54) CONTENT ORCHESTRATION FOR ASSEMBLY OF CUSTOMIZED CONTENT STREAMS

(71) Applicant: Disney Enterprises, Inc., Burbank, CA (US)

(72) Inventors: Christopher Elm, Los Angeles, CA (US); Tyler Knight, Burbank, CA (US); Michael M. Martin, Los Angeles, CA (US); Kenneth J. Michel, Brightwaters, NY (US); Maged Boctor, La Mirada, CA (US); Stuart Loberg, Mill Creek, WA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/045,610

(22) Filed: Oct. 3, 2013

(65) Prior Publication Data

US 2014/0304757 A1 Oct. 9, 2014

Related U.S. Application Data

(60) Provisional application No. 61/809,259, filed on Apr. 5, 2013.

(51) Int. Cl.
*H04N 21/2665* (2011.01)
*H04N 21/236* (2011.01)
(Continued)

(52) U.S. Cl.
CPC ......... *H04N 21/2665* (2013.01); *H04H 20/103* (2013.01); *H04N 21/236* (2013.01); *H04H 60/50* (2013.01)

(58) Field of Classification Search
USPC ........ 725/34–36, 46, 114, 116, 119, 144, 146
See application file for complete search history.

(56) References Cited

U.S. PATENT DOCUMENTS 8,700,797 B2 * 4/2014 Kim .............................. 709/231
2001/0037500 A1 * 11/2001 Reynolds et al. ............... 725/36
(Continued)

FOREIGN PATENT DOCUMENTS

| JP | 2001218183 A | 8/2001 |
| JP | 2004185456 A | 7/2004 |
| KR | 10-2010-0106628 | 10/2010 |
| KR | 10-2012-0080638 | 7/2012 |
| WO | WO 2008/116305 | 10/2008 |

OTHER PUBLICATIONS

Extended European Search Report dated Mar. 28, 2014 for European Patent Application No. 14150697.2-1908.
(Continued)

*Primary Examiner* — Mulugeta Mengesha
(74) *Attorney, Agent, or Firm* — Farjami & Farjami LLP

(57) ABSTRACT

There is provided a content orchestration system and a method for use by the content orchestration system to enable assembly of one or more customized content streams. In one implementation, such a content orchestration system includes a computing platform having a processor, and a content orchestration engine for execution by the processor. The content orchestration engine is configured to receive data describing multiple content sources capable of providing content for use in assembling a customized content stream. The content orchestration engine is also configured to identify customization guidelines corresponding to a destination of the customized content stream, and to determine instructions for assembling the customized content stream based on the data and the customization guidelines.

20 Claims, 3 Drawing Sheets

(51) Int. Cl.
*H04H 20/10* (2008.01)
*H04H 60/50* (2008.01)

(56) References Cited

U.S. PATENT DOCUMENTS

| | | |
|---|---|---|
| 2002/0057297 A1* | 5/2002 | Grimes et al. ............... 345/810 |
| 2007/0226765 A1 | 9/2007 | Bahnck |
| 2008/0168487 A1 | 7/2008 | Chow |
| 2009/0187938 A1 | 7/2009 | De Heer |
| 2011/0082915 A1 | 4/2011 | Carr |
| 2011/0099599 A1 | 4/2011 | Rusch-Ihwe |
| 2013/0246567 A1* | 9/2013 | Green et al. ................... 709/217 |
| 2014/0282656 A1* | 9/2014 | Belyaev et al. ................ 725/14 |

OTHER PUBLICATIONS

English Translation of Japanese Office Action dated Mar. 31, 2015, for Japanese Patent Application 2014-007101.
Japanese Office Action dated Mar. 31, 2015 for Japanese Patent Application 2014-007101.
Korean Office Action dated Jan. 6, 2015 for Korean Patent Application No. 10-2014-0006519.
English Translation of Korean Office Action dated Jan. 6, 2015 for Korean Patent Application No. 10-2014-0006519.

* cited by examiner

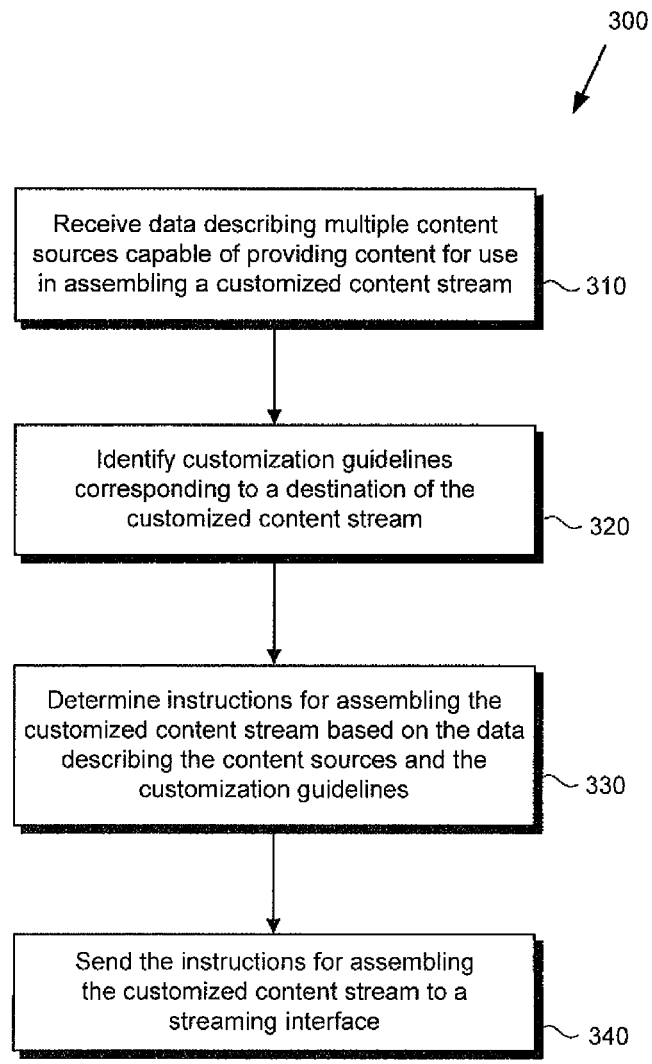

CONTENT ORCHESTRATION FOR ASSEMBLY OF CUSTOMIZED CONTENT STREAMS

RELATED APPLICATIONS

The present application claims the benefit of and priority to a pending Provisional Patent Application Ser. No. 61/809,259, filed Apr. 5, 2013, and titled "Real-time Dynamically Scalable Cloud-Based Video Assembly," which is hereby incorporated fully by reference into the present application.

BACKGROUND

The proliferation of distribution modes by which content, such as television (TV) content, can be delivered to consumers has given those consumers an unprecedented degree of control over when, where, and how to enjoy their entertainment of choice. For example, the ever-increasing selection of news, sports, and dramatic entertainment content available Over the Internet has enabled consumers to view what had been traditional TV programming content using any of a variety of personal communication devices, such as a Smartphone or tablet computer, at a time and place of their own choosing.

The increased viewing options now available to consumers have created both challenges and opportunities for content providers. For example, agreements determining compensation for advertising delivered using one distribution mode, such as a linear TV broadcast, may not apply when substantially the same advertising content is delivered using an alternative distribution mode, such as streaming content delivered over the Internet. In addition, there may be constraints placed on the delivery of some content, based on the distribution mode used to deliver the content, or the type of communication device utilized by the consumer to view the content. On the other hand, Internet Protocol (IP) distribution of content offers the hitherto largely unrealized potential to provide customized entertainment content, as well as customized advertising and/or promotional content, to consumers on a household-by-household or even viewer-by-viewer basis.

SUMMARY

There are provided content orchestration systems and methods for assembly of customized content streams, substantially as shown in and/or described in connection with at least one of the figures, and as set forth more completely in the claims.

BRIEF DESCRIPTION OF THE DRAWINGS

FIG. 3 is a flowchart presenting an exemplary method for use by a content orchestration system to enable assembly of a customized content stream.

DETAILED DESCRIPTION

Figure 1:
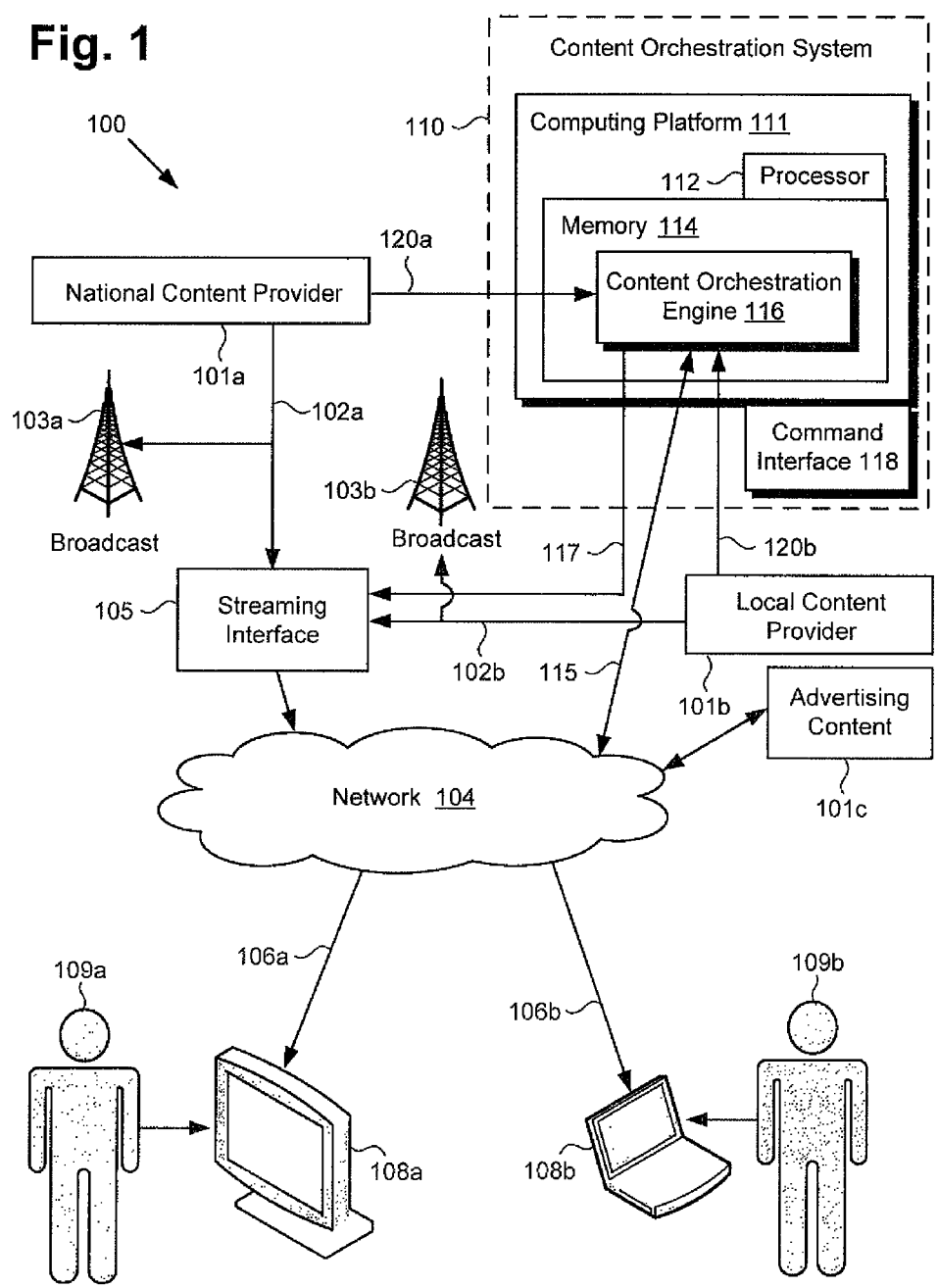
FIG. 1 shows a diagram of one exemplary implementation of a content orchestration system.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As noted above, the increased viewing options for consumers of television (TV) program content enabled by advances in technology have created significant challenges for content providers attempting to assure viewer loyalty, as well as to generate revenue though advertising and promotions. For example, and as also noted above, contractual agreements covering compensation for advertising delivered as part of a linear TV broadcast may not apply when substantially the same advertising content is delivered using an alternative distribution mode, such as over the Internet. In addition, there may be other types of content included in a linear TV broadcast for which the TV broadcaster does not have Internet distribution rights. By way of example, Internet distribution rights for many sporting events are typically controlled by the sports league or team, rather than a TV broadcaster.

The present application is directed to a real-time dynamically scalable cloud based solution configured to orchestrate numerous technical systems and to perform other functions to ensure that live content, such as live programming, as well as advertising and scheduled programming, are properly displayed to viewers. The present application discloses a novel solution by which a multitude of customized content streams, such as television or other video streams, can be created in a virtual environment by aggregating multiple sources of data or metadata from a national and local program provider. The customized content streams may be derived from data contained within a parent content source from a national provider, such as a television network or a cable provider, and/or to data provided by a local affiliate provider. The present content orchestration solution enables assembly of a frame accurate customized video stream from multiple video stream sources, for example, through replacement of individual programs and/or commercials and/or interstitial content in an automated fashion, in a virtual environment. As a result, the present content orchestration solution enables delivery of a substantially unique, personalized content stream to an individual user or viewer.

The present content orchestration solution may include two distinct but interrelated parts, a complexity engine (hereinafter "content orchestration engine") and a command interface. The content orchestration engine may be configured to manage the state of a content delivery process to ascertain what broadcast mode is operative, for example live broadcast versus scheduled broadcast and to manage the operative mode according to the business rules of the broadcast. The content orchestration engine may also be configured to monitor the relationship amongst a group of content sources capable of providing content for use in assembling a customized content stream, and to identify which entity is the primary content source authorized to control the customized content stream at any given time.

FIG. 1 shows a diagram of one exemplary implementation of a content orchestration system for enabling assembly of customized content streams. As shown in FIG. 1, content distribution environment 100 includes content orchestration system 110 having computing platform 111 and command interface 118. Computing platform 111 includes processor 112 and content orchestration engine 116 stored in memory 114. Also shown in FIG. 1 are respective national and local content providers 101a and 101b providing respective content streams 102a and 102b. Content streams 102a and 102b serve as content sources capable of providing content for use in assembling customized content stream(s) 106a and/or 106b. Content streams 102a and 102b may also be used as respective sources for national and local broadcasts using respective national and local broadcasting platforms 103a and 103b. As further shown in FIG. 1, national content provider 101a provides content source description data 120a describing content stream 102a to content orchestration engine 116, while local content provider 101b provides content source description data 120b describing content stream 102b to content orchestration engine 116.

In addition, FIG. 1 shows communication network 104, and streaming interface 105 receiving content streams 102a and 102h, as well as instructions 117 from content orchestration engine 116. Streaming interface 105 may be configured to adapt the content available from content streams 102a and/or 102b for distribution over communication network 104. Also shown is network link 115 enabling communication among content orchestration system 110 and other features of content distribution environment 100 over communication network 104. Content distribution environment 100 may also include advertising content source 101c providing advertising content, and users or viewers 109a and 109b using respective client systems 108a and 108b to receive respective customized content streams 106a and 106b.

It is noted that although client system 108a is depicted as a Smart TV, and client system 108b is depicted as a laptop type personal computer (PC), in FIG. 1, one or both of client systems 108a and 108b may be implemented as any Internet Protocol (IP) compatible device with display capabilities. For example, in other implementations, one or both of client systems 108a and 108b may take the form of a desktop computer, a netbook, a tablet computer, a gaming console, or a Smartphone, for example. It is further noted that local content provider 101b may be an affiliate of national content provider 101a, and in that role may be a local content provider for the destination of customized content streams 106a and/or 106b. For example, where client systems 108a and 108b used by respective viewers 109a and 109b are located in the greater Los Angeles area, national content provider 101a may correspond to a New York based parent station of the American Broadcasting Company (ABC™), while local content provider 101b may correspond to its Los Angeles affiliate KABC-TV™.

Figure 2:
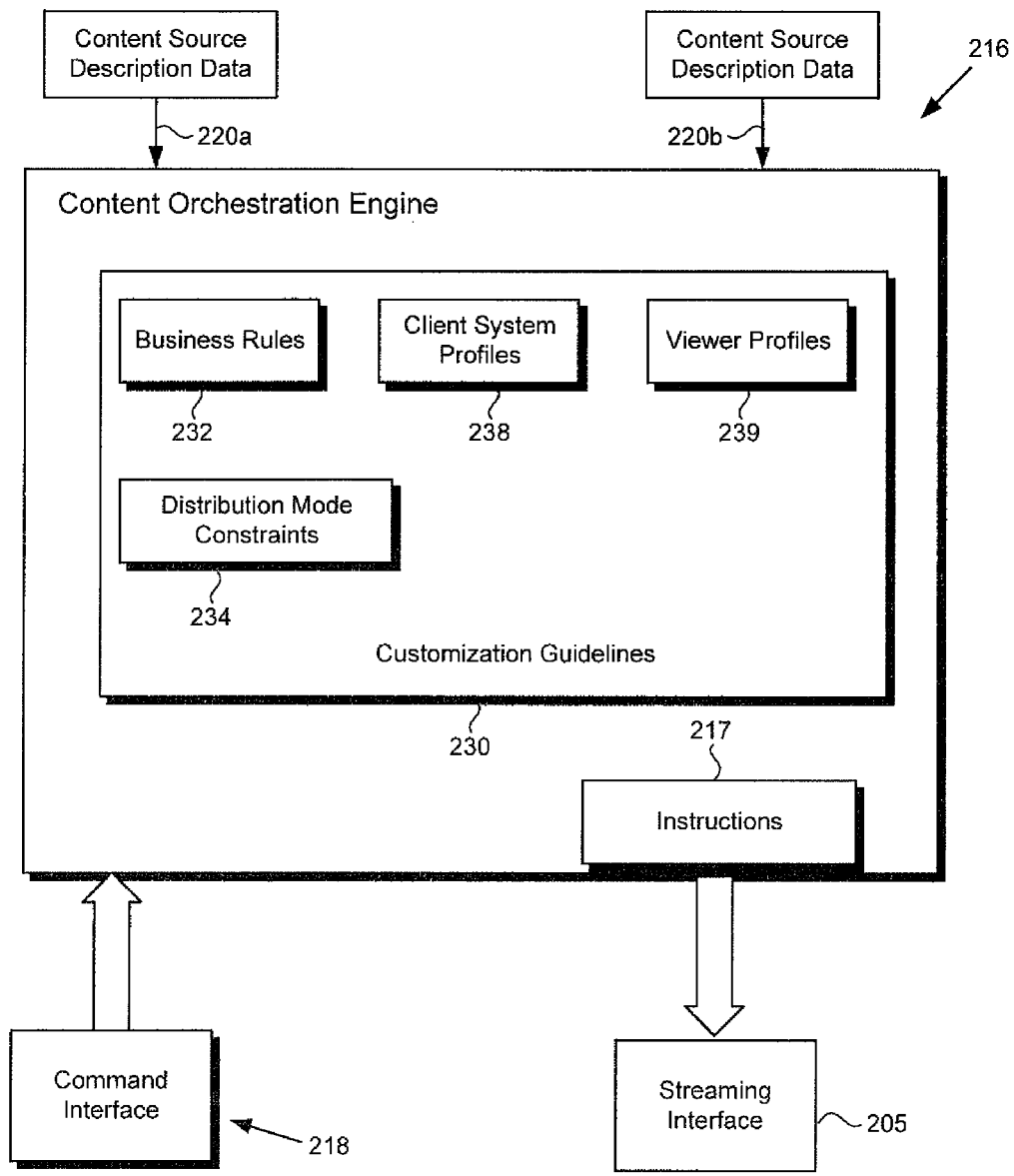
FIG. 2 shows a more detailed representation of a content orchestration engine suitable for use in the content orchestration system of FIG. 1, according to one implementation.

Referring to FIG. 2, FIG. 2 shows a more detailed representation of content orchestration engine 216 suitable for use in content orchestration system 110 in FIG. 1, according to one implementation. As shown in FIG. 2, content orchestration engine 216 receives content source description data 220a and 220b, is configured to accept inputs from command interface 218, and determines content assembly instructions 217 for use by streaming interface 205. Content orchestration engine 216 receiving content source descriptive data 220a and 220b and determining instructions 217, corresponds to content orchestration engine 116 receiving content source descriptive data 120a and 120b and determining instructions 117, in FIG. 1. In addition, command interface 218 and streaming interface 205, in FIG. 2, correspond respectively to command interface 118 and streaming interface 105, in FIG. 1. Also shown in FIG. 2 are customization guidelines 230, which may include business rules 232, client system profile data 238, and viewer profile data 239. Moreover, in some implementations customization guidelines 230 may include distribution mode constraints 234.

Referring to FIGS. 1 and 2 together, content orchestration system 110 may utilize processor 112 to execute content orchestration engine 116/216 to determine instructions 117/217 enabling substantially real-time assembly of customized content stream(s) 106a and/or 106b. For example, content orchestration engine 116/216, under the control of processor 112 may be configured to receive content source description data 120a/220a and 120b/220b describing the content sources capable of providing content for use in assembling customized content stream(s) 106a and/or 1061), e.g., content streams 102a and 102b.

Content orchestration engine 116/216 may also be configured to identify customization guidelines 230 for assembly of customized content streams 106a and 106b. Customization guidelines 230 may correspond to the destinations of customized content stream(s) 106a and/or 106b. For example, customization guidelines 230 may include viewer profile data 239 corresponding to user histories of viewer(s) 109a and/or 109b, or to their respective geographical locations. Moreover, in some implementations, customization guidelines 230 may include client system profile data 238 corresponding to content playback features or capabilities of client system(s) 108a and/or 108b.

Content orchestration engine 116/216 is further configured to determine instructions 117/217 for assembling customized content stream(s) 106a and/or 106b based on customization guidelines 230 and content source description data 120a/220a and 120b/220b. In one implementation, instructions 117/217 enable assembly of customized content stream(s) 106a and/or 106b as one or more personalized content stream(s) for delivery to one or more individual user(s), such as respective viewer(s) 109a and/or 109b. Moreover, where content streams 102a and 102b include video streams, instructions 117/217 can enable assembly of frame accurate customized video streams from the video streams included in content streams 102a and 102b for inclusion in customized content stream(s) 106a and/or 106b.

Content orchestration engine 116/216 may be configured to determine instructions 117/217 in a substantially automated way. However, in some implementations it may be advantageous or desirable to override or modify instructions 117/217 through human intercession. In those instances, command interface 118/218 may be used to input one or more content assembly commands to content orchestration engine 116/216. Thus, content orchestration engine 116/216 may be configured to determine instructions 117/217 based not only on content source description data 120a/220a, content source description data 120b/220b, and customization guidelines 230, but also on content assembly commands received through command interface 118/218.

It is noted that command interface 118/218 may be implemented using one or more virtual control centers for accepting content assembly commands from an authorized content programmer. As a result, command interface 118/218 may have multiple physical and/or virtual instantiations and may enable one or more authorized content programmers remote from computing platform 111 to influence determination of instructions 117/217 by content orchestration engine 116/216.

In some implementations, content orchestration engine 116/216 may be configured to determine instructions 117/217 directing assembly of customized content stream(s) 106a and/or 106b using one or more of advertising content, program content, such as a TV program episode or a segment of an episode, or promotional content drawn from content streams 102a and 102b. In some implementations, instructions 117/217 may include identifying one of content streams 102*a* or 102*b* as a primary content source for assembling one or more of customized content stream(s) 106*a* and/or 106*b*, and may instruct replacement of a portion of the primary content included in primary content stream 102*a* or 102*b* with content from the other content stream.

In some implementations, instructions 117/217 may authorize one or more third parties to provide content for use in assembling customized content stream(s) 106*a* and/or 106*b*. For example, data received by content orchestration engine 116/216 over network link 115 may be used to determine instructions 117/217 authorizing insertion of advertising content provided by advertising content source 101*c* into customized content stream(s) 106*a* and/or 106*b*.

In one exemplary implementation, one or both of content streams 102*a* and 102*b* may be linear TV program streams, for example, each including a high-definition (HD) or standard-definition (SD) baseband video signal with embedded audio, captions, time code, and other data or metadata, such as ratings and/or parental guidelines. In some implementations, content streams 102*a* and/or 102*b* may include multiple audio tracks, and may utilize secondary audio programming (SAP) and/or Descriptive Video Service (DVS), for example. As shown in FIG. 1, content streams 102*a* and 102*b* may be broadcast to a traditional TV audience using respective broadcasting platforms 103*a* and 103*b*, which may correspond to conventional cable and/or satellite networks, for example. In addition, national content provider 101*a* and/or local content provider 101*b* may find it advantageous or desirable to make content from respective content streams 102*a* and 102*b* available via an alternative distribution mode, such as communication is network 104, which may comprise a packet network, for example, such as the Internet.

National content provider 101*a* and/or local content provider 101*b* may also deem it advantageous or desirable to deliver content from respective content streams 102*a* and/or 102*b* over communication network 104 substantially concurrently with its provision using broadcasting platform(s) 103*a* and/or 103*b*. In addition, one or both of national content provider(s) 101*a* and/or local content provider 101*b* may choose to selectively replace one or more attributes of content streams 102*a* and 102*b*, such as program episodes, national or local news, sports coverage, live content, and advertisements or a block of advertising (hereinafter "ad pod"), based on viewer profile data 238 and/or client system profile data 239. Alternatively, or in addition, one or more content features in program stream(s) 102*a* and/or 102(*b*) may be replaced due to business rules 232 and/or distribution mode constraints 234 related to distribution rights, for example. Those replacements may be performed based on instructions 117/217. In addition, it is noted that when instructing assembly of customized content including live content, instructions 117/217 can enable assembly of customized content so as to include the live content substantially in real-time.

FIGS. 1 and 2 will now be further described by reference to FIG. 3, which presents flowchart 300 describing an example method for use by a content orchestration system to enable assembly of a customized content stream. With respect to the method outlined in FIG. 3, it is noted that certain details and features have been left out of flowchart 300 in order not to obscure the discussion of the inventive features in the present application.

Referring to FIG. 3 in combination with FIGS. 1 and 2, flowchart 300 begins with receiving data describing multiple content sources capable of providing content for use in assembling customized content stream(s) 106*a* and/or 106*b* (310). The receiving may be performed by content orchestration engine 116/216 under the control of processor 112, and may correspond to receiving content source description data 120*a*/220*a* and 120*b*/220*b* describing respective content streams 102*a* and 102*b*. Content source description data 120*a*/220*a* and 120*b*/220*b* may include metadata identifying various aspects of respective content streams 102*a* and 102*b*. For example, content source description data 120*a*/220*a* and 120*b*/220*b* may include information regarding a content stream event as metadata.

A content stream event may be any cognizable portion or segment of content streams 102*a* and 102*b*. For example, a content stream event may be an episode of programming content, a segment of such an episode, an advertisement, an ad pod, or a unit of promotional content. Data or metadata regarding such a content stream event may include identification of an event boundary corresponding to initiation of the content stream event and/or information describing the duration of the content stream event. Identification of the event boundary may include identification of a start time of the content stream event, or a video frame number or time address corresponding to initiation of the program stream event. The duration of the content stream event may be described by content source description data 120*a*/220*a* and 120*b*/220*b* in terms of time lapse in hours and/or minutes and/or seconds, or in terms of the number of video frames spanned by the content stream event, for example. Thus, content source description data is 120*a*/220*a* and 120*b*/220*b* can be used to characterize discrete content stream events within respective content streams 102*a* and 102*b*.

It is noted that although FIG. 1 depicts two content streams, i.e., content streams 102*a* and 102*b*, that representation is merely exemplary. In other implementations, content orchestration engine 116/216 may be configured to receive content source description data for additional content streams. For example, in an implementation corresponding in general to FIG. 1, content distribution environment 100 may include a content stream provided by a live feed and/or a live or recorded sports content stream provided by a sports broadcaster, in addition to content stream 102*a* from national content provider 101*a* and content stream 102*b* from local content provider 101*b*. In those implementations, content orchestration engine 116 may receive content source description data relevant to the live feed and/or sports content in addition to content source description data 120*a*/220*a* and 120*b*/220*b*. In addition, in some implementations, content orchestration engine 116/216 may receive content source description data describing advertising content available from advertising content source 101*c*. That additional content source description data may be received by content orchestration engine 116/216 over communication network 104, such as over network link 115 for example.

Flowchart 300 continues with identifying customization guidelines 230 corresponding to a destination of customized content stream(s) 106*a* and/or 106*b* (320). Customization guidelines 230 may be identified by content orchestration engine 116/216 using data received from respective client systems 108*a* or 108*b* over communication is network 104 and/or from data stored in memory 114 of content orchestration system 110. As noted above, customization guidelines 230 corresponding to the destination of customized content stream(s) 106*a* and/or 106*b* may include business rules 232, distribution mode constraints 234, client system profile data 238, and/or viewer profile data 239.

Flowchart 300 continues with determining instructions 117/217 for assembling customized content stream(s) 106*a* and/or 106*b*) based on content source description data 120*a*/220*a* content source description data 120*b*/220*b*, and customization guidelines 230 (330). Determination of instructions 117/217 may be performed by content orchestration engine 116/216 under the control of processor 112. Instructions 117/217 may identify a primary content source for use as a template for assembly of customized content streams 106a or 106b, for example.

As a specific example, instructions 117/217 may identify content stream 102a as a primary content source for assembly of customized content stream 106b). In addition, instructions 117/217 may include an instruction to replace a portion of content stream 102a, such as a content stream event within content stream 102a, with content from content stream 102b, or another available content source. In other words, in some implementations, content orchestration engine 116/216 may determine instructions 117/217 that not only direct replacement of a portion of content available from a primary content source, but also identifies the replacement content. In implementations in which content stream 102a is a linear TV program stream, replacement content identified by instructions 117/217 may include another TV program, another episode of the same TV program, a special event, or live feed content, for example.

Alternatively, or in addition, replacement content may be identified dynamically by a separate authorized entity, such as advertising content source 101c, based on instructions 117/217. In one such implementation, instructions 117/217 may authorize replacement of an advertisement or an entire ad pod, but not specify the replacement advertising content to take its place, thereby enabling use of highly individualized JP based targeting tools to direct different advertisements to viewers 109a and 109b based on their respective viewer preferences. For instance, advertising content source 101c may collect or access information regarding the Internet browsing histories of client systems 108a and 108b and identify replacement advertising content that is presumptively appealing to respective viewers 109a and 109b.

It is noted that in some implementations, it may be desirable for instructions 117/217 to be based, at least in part, on a manual input. In such implementations, command interface 118/218 may be used to input a content assembly command. For example, a content programmer monitoring content stream 102a and/or 102b may utilize command interface 118/218 to force or prevent content replacement, or to override automated preferences for identifying replacement content.

Flowchart 300 concludes with sending instructions 117/217 for assembling customized content stream(s) 106a and/or 106b to streaming interface 105/205 (340). In one implementation, content orchestration engine 116/216 may be configured to send instructions 117/217 in the form of streaming application programming interface (streaming API) calls to streaming interface 105/205. As noted above, instructions 117/217 enable assembly of customized content stream(s) 106a and/or 106b from content contained in content streams 102a and/or 102b as well as other content sources, which may include live content sources. Moreover, instructions 117/217 can enable assembly of a frame accurate customized video stream, as well as a customized content stream including live content substantially in real-time. As a result, customized content stream(s) 106a and/or 106b can include a variety of content including live content, sports, news, and dramatic entertainment content, and may be provided as personalized content stream(s) 106a and/or 106b for delivery to respective individual viewer(s) 109a and/or 109b.

Thus, from the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the spirit and the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A content orchestration system comprising:
a computing platform having a processor;
a content orchestration engine for execution by the processor, the content orchestration engine configured to:
receive data describing a plurality of content sources capable of providing content for use in assembling a customized content stream;
monitor a relationship amongst a group of the plurality of content sources;
identify customization guidelines corresponding to a destination of the customized content stream; and
determine instructions for assembling the customized content stream based on the data, the relationship, the customization guidelines and a content assembly command input by a user, wherein the instructions include identifying one of the plurality of content sources as a primary content source for assembling the customized content stream.

2. The content orchestration system of claim 1, further comprising a command interface for inputting the content assembly command to the content orchestration engine.

3. The content orchestration system of claim 1, wherein the content orchestration system is further configured to:
send the instructions for assembling the customized content stream to a streaming interface in the form of streaming application programming interface calls.

4. The content orchestration system of claim 3, wherein the instructions include an instruction to replace a portion of primary content from the primary content source with content from another of the plurality of content sources.

5. The content orchestration system of claim 4, wherein the instructions include an instruction to replace a portion of the primary content with live content.

6. The content orchestration system. of claim 5, wherein the instructions enable assembly of the customized content stream so as to include the live content substantially in real-time.

7. The content orchestration system of claim 1, wherein the plurality of content sources include a first content stream from a national content provider and a second content stream from an affiliate of the national content provider, the affiliate being a local content provider for the destination of the customized content stream.

8. The content orchestration system of claim 1, wherein the plurality of content sources comprise a plurality of video streams.

9. The content orchestration system of claim 8, wherein the instructions enable assembly of a frame accurate customized video stream from the plurality of video streams.

10. The content orchestration system of claim 1, wherein the instructions enable assembly of the customized content stream as a personalized content stream for delivery to an individual user.

11. A method for use by a content orchestration system to enable assembly of a customized content stream, the method comprising:

receiving data describing a plurality of content sources capable of providing content for use in assembling the customized content stream;

monitoring a relationship amongst a group of the plurality of content sources;

identifying customization guidelines corresponding to a destination of the customized content stream; and determining instructions for assembling the customized content stream based on the data, the relationship, the customization guidelines and a content assembly command input by a user, wherein the instructions include identifying one of the plurality of content sources as a primary content source for assembling the customized content stream.

12. The method of claim 11, wherein the content orchestration system further comprises a command interface for inputting the content assembly command.

13. The method of claim 11, wherein the method further comprises:

sending the instructions for assembling the customized content stream to a streaming interface in the form of streaming application programming interface calls.

14. The method of claim 13, wherein the instructions include an instruction to replace a portion of primary content from the primary content source with content from another of the plurality of content sources.

15. The method of claim 14, wherein the instructions include an instruction to replace a portion of the primary content with live content.

16. The method of claim 15, wherein the instructions enable assembly of the customized content stream so as to include the live content substantially in real-time.

17. The method of claim 11, wherein the plurality of content sources include a first content stream from a national content provider and a second content stream from an affiliate of the national content provider, the affiliate being a local content provider for the destination of the customized content stream.

18. The method of claim 11, wherein the plurality of content sources comprise video streams.

19. The method of claim 18, wherein the instructions enable assembly of a frame accurate customized video stream from the plurality of video streams.

20. The method of claim 11, wherein the instructions enable assembly of the customized content stream as a personalized content stream for delivery to an individual user.

* * * * *